United States Patent Office 3,513,001
Patented May 19, 1970

3,513,001
THERMOSETTING COMPOSITIONS AND METHODS OF MAKING THEM
John Edward Worthington, Tonbridge, and James Seward Woodhead, Tunbridge Wells, England, assignors to Polygram Casting Co. Limited, Kent, England, a British company
No Drawing. Continuation of application Ser. No. 420,802, Dec. 23, 1964. This application Sept. 19, 1966, Ser. No. 580,510
Claims priority, application Great Britain, Jan. 14, 1960, 1,466/60; May 23, 1960, 18,146/60; Nov. 10, 1960, 38,712/60
The portion of the term of the patent subsequent to July 24, 1979, has been disclaimed
Int. Cl. B28b 7/00; C08b 25/00
U.S. Cl. 106—38.5                   12 Claims

ABSTRACT OF THE DISCLOSURE

A thermosetting composition suitable for use as a binder in a shell moulding process comprising a carbohydrate, an acid or salt of sulphuric, phosphoric or hydrochloric acid, tannins, hexamethylenetetramine, melamine and dicyandiamide.

---

The present invention relates to thermosetting compositions suitable for use as binders in the shell moulding process (i.e. in the making of shell moulds or cores or parts thereof) and for other purposes for which thermosetting compositions are used as, for example, in the production of plastic articles, in conjunction with suitable fillers such as are commonly used in the plastics industry and is a continuation of application Ser. No. 420,802, filed Dec. 23, 1964, now abandoned which is a continuation-in-part of application Ser. No. 81,957, filed Jan. 11, 1961, for "Thermosetting Compositions and Methods of making them," now abandoned.

Attempts have been made to find cheaper substitutes for the phenolic resins and other binders conventionally used in the shell mould process, but these have generally shown faults which impair their usefulness, such as the evolution of unpleasant or noxious fumes, hygroscopic properties resulting in the rapid deterioration of the product in storage, or requiring certain physical conditions during the production of the product, such as the maintenance of certain temperature conditions.

It is an object of the present invention to provide a thermosetting composition that does not possess these faults to any significant extent.

According to the present invention a thermosetting composition comprises a major proportion by weight of a carbohydrate (preferably the carbohydrate is mixed with a minor proportion of either a mineral acid or a salt liberating such an acid on heating, such as, for example, the ammonium salt of sulphuric or hydrochloric acid), a minor proportion of a carboxylic acid, preferably a polycarboxylic acid, preferably containing additional groups such as hydroxyl or amino groups or an aromatic carboxylic acid with active $\alpha$ carbon atoms, or a mixture of two or more such acids and a still smaller proportion of one or more cross-linking agents and of one or more amines.

By "major proportion" is meant at least 51% by weight. It is however preferable to use a proportion of carbohydrate lying within the range of from 75–95% by weight of the composition.

The carbohydrate may be a mono- or disaccharide or a substitution compound thereof. If higher saccharides are used hydrolysis must be effected prior to admixture with the other constituents. The preferred carbohydrates are, however, mono- saccharides, for example, dextrose (glucose) and fructose but sucrose, maltose and lactose can be used provided that they are hydrolysed to their component monosaccharides prior to or during the resinification reaction. If disaccharides are used, the conditions of the reaction are such that this hydrolysis is usually effected.

The choice of the organic acid is in the main an economic one since the reaction scheme usually requires less of a polycarboxylic acid than of a monocarboxylic acid. However, it is essential that the aglycon side chain of the ester formed as a result of the reaction between the acid and the carbohydrate must contain reactive groups capable of forming chemical bridges between the aglycon side chain of the N-glycoside produced by the reaction between the amino group of the amine and the hemiacetal group of the carbohydrate. Such reactive groups as hydroxyl and amino groups and free $\alpha$ hydrogen atoms or aromatic aglycons are suitable.

A convenient economic source of organic acid constitutents is to be found in the group of compounds known conventionally as "tannins," which may be defined as chemical extracts or physically disintegrated powders from certain woods, and which are conventionally used in the tanning industry. They can be divided into two groups—the hydrolysable and the condensed, typical examples of the groups being myrabolam and quebracho extracts respectively. The commercially available extracts contain, in addition to organic acids, various other substances naturally present in the raw materials but are quite suitable as constituents of the thermosetting composition.

However, other acids such as, for example, citric and gallic acids may be used.

The cross-linking agents are difunctional compounds, for example, formaldehyde, paraformaldehyde, and formaldehyde compounds generally, hexamethylene tetramine, maleic anhydride and phthalic anhydride.

The amine may be a mono-, di- or polyamine, for example aniline, meta- or para-phenylene diamine, glutamine, dicyandiamide and melamine. The reactions taking place are complex and not thoroughly understood. While not wishing to confine the invention in any way it is thought that suitable amines should be capable initially of reacting with the hemiacetal group of the carbohydrate, then of further reaction with cross linking agents, such as formaldehyde and the other difunctional compounds mentioned above. For example, aniline can be further substituted in the benzene ring and melamine has two other amino groups for this purpose. The amine is preferably a di- or polyamine and may be used in the form of a salt, for example a sulphate, phosphate or hydrochloride.

The carbohydrate and organic acid constituents require to be intimately mixed and for this purpose are preferably obtained in a powdered form. The other constituent or constituents should, if solid, also be in powdered form, but if liquids the amount used is so small that on mixing the constituents the liquids are dispersed among and absorbed by the powders.

A particularly convenient mixture of a carbohydrate and a salt liberating a mineral acid on heating is commercially available under the trade name "Dexacor A 4701" which is described in British pat. specification No. 770,561 and which comprises dextrose monohydrate incorporating about 6% of ammonium sulphate. Inorganic acids such as hydrochloric or phosphoric acid can be used in place of the ammonium sulphate.

The presence of water in the composition materially alters the course of the resinification reaction so the ingredients of the composition are preferably anhydrous. If the water content of the composition is not carefully controlled variable products may be obtained.

A particular example of a composition embodying the invention contains a carbohydrate in the form of dextrose monohydrate (mixed with 6% ammonium sulphate), about 10% by weight of tannin as sulphited quebracho extract, and from about 0.5%–2.0% each of an amine and cross-linking agent, respectively, aniline and hexamethylene tetramine. The weights of the other constituents are expressed as percentages by weight of the carbohydrate.

The precise proportions employed depend to a large extent on the final properties required of the composition and considerable variation is possible. In general, an increase in the organic acid content increases the strength of the article made from the composition although for many practical purposes a satisfactory strength is achieved when the acid present reaches a proportion of about 20% by weight. Any increase beyond that value yields decreasing increments in strength and soon becomes uneconomic.

In the case of the amines and the cross-linking agents the final strength required determines the amount to be added. No increase in strength is obtained however if the proportions of such added are substantially greater than 5.0% by weight. In the case of the amine however, for practical purposes it may be desirable to increase the proportion added up to 15% when a liquid amine such as aniline is used in order to compensate for losses during mixing and to ensure dissemination throughout the other constituents.

Preferably the proportion of the organic acid constituent may vary from 5 to 20% and the proportion of the amine and cross-linking agent may vary from 1 to 15% and from 0.2 to 5% respectively by weight, each of which percentages is calculated on the weight of the carbohydrate.

The proportions of the several ingredients are so chosen that on the application of heat to raise the temperature to approximately 150° C. or above they react to form a thermosetting resin-like product the properties of which are such that it can be used to replace phenol formaldehyde synthetic resins or other materials commonly used in the production of moulded products or of shell moulds or cores.

Thermosetting compositions embodying the invention may be used (in conjunction with fillers well known to those versed in the arts) in the manufacture of plastic articles and in the shell mould process in substitution in whole or in part for thermosetting materials used at present.

In the production of plastic articles, the thermosetting composition embodying the present invention is mixed with any of the customary fillers, and is subsequently moulded to shape under pressure and heat by methods which are well known to those versed in the art. The proportion of thermosetting composition to filler will depend upon the nature of the filler and on the nature of the article to be produced.

Further, the thermosetting composition of the invention can also be used to make plastic articles without moulding under pressure but by using a process similar to that used in making shell moulds. The fillers employed in such a process must be sufficiently resistant to heat at the temperatures normally used in the shell mould process.

Also, the composition can be used to make sintered or porous metal products. The powdered metal is mixed with the thermosetting composition, is set in a heated mould and afterwards the composition is burned out by the application of further heat.

The thermosetting composition may also be employed in the manufacture of foamed thermal insulating material by heating in the absence of pressure together with substances which liberate large volumes of nitrogen or other inert gas on heating, for example, azo dicarbonamide, azo diisobutyronitrile and para-para'-oxy-bis (benzene sulphonyl hydrazide).

The thermosetting composition may also be used for making cores and moulds according to the more usual foundry processes.

For use in the production of shell moulds and cores the powdered composition must be mixed with a granular refractory material such as silica sand, zircon sand or any of the other refractory materials commonly used and well known to those engaged in the foundry industry.

It has been found that the type of mixer used for mixing together the refractory materials and powdered compositions can greatly affect the strength of the shell moulds or cores subsequently produced from the product. Best results have been obtained using a roller type mixer in which a degree of scrubbing or sliding occurs during the rotation of the rollers over the pan of the mixer, and at the same time considerable pressure must be exerted on the mixture by the rollers. For example, satisfactory results have been obtained using a Mullrex muller in which the width of the rollers is sufficient to impart a sliding action over the mixture during the rotation of the rollers. Experiments suggest that the ratio of the dimensions of the roller edge to the pan diameter, together with the weight of the rollers is important, and that beneficial results are obtained when the roller edge occupies a considerable fraction of the pan diameter.

The carbohydrate may be heated to a temperature within the range 118–140° C. with the granular refractory material to produce a partially coated product. The organic acid can be added to the granular refractory material either with the carbohydrate or subsequently. After grinding the cooled product to a suitable particle size, a cross-linking agent and reactive amine are added.

For convenience, the organic acid, the amine and mineral acid or salt liberating an acid when heated can be added to the hot sand with the carbohydrate. It is preferable to add the cross-linking agent after grinding the cooled product.

The cure rate of the moulding mixture is accelerated if the organic acid and the mineral acid or salt liberating an acid are heated with the carbohydrate during the mixing process.

More particularly a satisfactory moulding composition may be made using the following steps:

(1) Mixing together the powdered carbohydrate, the amine, the organic acid and the inorganic acid, or salt liberating such acid on heating.

(2) Charging granular refractory material heated to 100 to 140° C. to the Mullrex mill.

(3) Charging the mixture obtained from (1) to the granular refractory material and mixing for a period which can vary from as low as 1 minute to approximately 10 minutes.

(4) Discharging the product to cool to a temperature of 90° C. or lower. It is possible to allow the mix to cool to ambient temperature.

(5) Recharging the mix into the mixer and adding the cross-linking agents and continuing the mixing until a uniform dispersion is obtained.

Satisfactory investment properties may be obtained by the use of a solid amine such as melamine or dicyandiamide or a mixture of melamine and dicyandiamide without heating in the mixing stage and the cold granular refractory material is weighed into, preferably a roller type mill, as previously described, and the required quantity of the previously mixed powdered composition is added. Mixing is continued until such time as the powdered binder is uniformly distributed throughout the granular refractory material. A satisfactory dispersion can normally be obtained in approximately 2–5 minutes depending upon the characteristics of the mill. The quantity of powdered constituent added to the mill will depend upon requirements but normally will lie between 2% and 10% by weight of the granular refractory material.

The whole or a part of the amine constituent and a part of the carboxylic acid constituent of the binder is advantageously added to the remainder of the constituents, after they have been mixed with the refractory material, in the form of an aqueous solution of a water soluble precondensate of the carboxylic acid and the amine. The precondensate may be made by dissolving 60 to 90 parts by weight of the carboxylic acid, preferably a tannin, and 40 to 10 parts by weight of the amine, preferably melamine or dicyandiamide or a mixture thereof in water and distilling off sufficient of the water to leave a solution in which the concentration of the precondensate is within the range of 40 to 60% by weight, calculated on the solution. If desired, the solution may be refluxed for a period to complete the reaction prior to distilling off some of the water. When a precondensate is added to the binder the proportion added is generally about half a pint of solution to each 1 cwt. of sand.

The use of such a precondensate results in binders which when used for making shell moulds and cores gives greater strength in the investment stage.

Alternatively, a small volume of a viscous liquid which will cause a thin coating to be deposited round the refractory grains and the powdered composition may be added to the constituents in the mil. The viscous liquid consists of a solution of a substance capable of producing a satisfactory envelope dissolved in a solvent which should be easily removable from the material by air drying and not be substantially retained by the other constituents of the thermosetting composition. For example, suitable solutions have been obtained by dissolving ethyl cellulose in methylated spirits, or melamine formaldehyde resins in water. The proportion of the solution required is not large, for example half a pint of a 2% ethyl cellulose solution will be adequate to coat a 1 cwt. batch of mixture of granular refractory material and powdered constituent. The melamine-formaldehyde resin can be added to the powdered composition as a solid. The addition of water to the mixture with the sand will form a satisfactory coating. It has been found that the proportion of the melamine-formaldehyde resin required can be varied between 2 and 10% by weight of the binder, and the quantity of water required can vary between 0.25% and 2% by weight of the binder and granular refractory material combined.

It has been found advantageous to add the solution or the water to the mixture of granular refractory material and powdered thermosetting composition immediately after these two materials have been mixed together in the roller mill. Whilst the mill is still rotating the solution or the water is added slowly to the mixture and mixing must usually be continued for a period of approximately four minutes, to obtain a satisfactory coating. During this time some of the solvent is removed from the mixture in the mill and a coating of the solute obtained round the bulk constituents. It is obvious that the solvent can be removed more completely and in a shorter time if the sand is slightly warm prior to its addition to the mill, though this is not essential for the successful production of a suitable material.

The last traces of solvent can readily be removed from the mixture after the mixture has been discharged from the mill either by allowing the mixture to air dry, or else more expeditiously by mechanical means such as a cyclone combined with a fan capable of lifting the grains of the mixture in an air current in which case the passage of the air stream would rapidly remove the remnants of the solvent. Preferably, however, a stream of dry air is passed through the mixture under fluidising conditions.

The advantages to be obtained by such a coating are:

(a) The production of a material for shell moulding or shell core making in which there is little or no separation of the powdered constituent from the granular refractory materials, and (b) The production of a material of improved investment characteristics in the production of shell moulds or cores.

Shell moulding mixtures comprising a refractory material such as sand mixed with a composition of this invention (modified if required by coating either with a viscous solution of ethyl cellulose in alcohol and subsequently removing the solvent or by the addition of melamine-formaldehyde resin and water and subsequently removing the water) may, for certain foundry purposes, be improved by the addition of small quantities of various substances, e.g. lubricants to prevent or minimise adhesion of the hardened shell mould or shell core to pattern plates and core boxes, for example silicones, or of substances which improve the surface finish of the casting such as graphite, silica flour or zircon flour. An especially advantageous additive is the synthetic high melting point wax sold under the trade name "Acrawax C," which has several desirable properties in so far as it improves the dry flow of the resultant product, increases the strength of moulds made from the product, increases the packing density of the invested material, and assists in stripping moulds and cores from the patterns or core boxes.

The proportion of the ingredients in the composition of the present invention can vary considerably. It has been found that suitable compositions can be obtained if the various proportion of the ingredients is maintained between the limits:

| | Parts |
|---|---|
| Carbohydrate (preferably including a mineral acid or salt liberating such an acid on heating) | 75–95 |
| Tannin | 5–20 |
| Mono-, di- or triamines | 1–15 |
| Cross-linking agents | ¼–5 | and a typical composition would be:

| | |
|---|---|
| Dexacor A 4701 | 90 |
| Sulphited quebracho extract | 12 |
| Melamine | 6 |
| Dicyandiamide | 2 |
| Hexamine | 2 |

In place of the Dexacor used in this example there may be substituted any other similar carbohydrate in admixture with about 6% of a mineral acid or a salt liberating an acid on heating.

A composition of this example may be mixed with sand or other suitable granular refractory materials in the proportion of, for example, 5% of powdered constituents by weight of the sand and, if desired, the product coated as described hereinbefore to form a shell moulding mixture. The mixture so produced will invest satisfactorily over the surface of any suitable pattern or core box heated to similar temperatures and in a similar manner to those customarily used in the shell moulding process. The investment characteristics can be improved, if required, by using a tannin-amine precondensate or by coating the product, as described hereinbefore, with either ethyl cellulose or a melamine-formaldehyde resin and water. Further heating for a period depending upon conditions but usually of between two and three minutes will generally be sufficient to cure the investment so produced.

A comparison of test pieces made from the uncoated moulding mixture mentioned compared with similar ones made from sand containing 5% phenolic resin binder yielded the following results:

Binder: Flexural breaking load, lbs.
Phenolic resin (depending on grade of resin, etc.) _____ 23–32
Composition of the example _____ 27–29

The binders according to the invention may also be used for the production of moulds and solid cores in the so-called "hot box" process which is described in "Fonderie," September 1959, No. 164, pages 395 to 407.

The binders according to the invention have several advantages over the phenol-formaldehyde resins and other materials hitherto used in the art. First, the ingredients are relatively cheap and are commercially available in powdered form and can be obtained of standardised and uniform quality. Secondly, the process of manufacture consists solely in intimately mixing the ingredients in the desired proportions and if necessary heating during this mixing and consequently it is possible to produce a composition of uniform quality without expensive controls or complicated apparatus. Finally, the powdered composition is clean and non-sticky and is not obnoxious to workers using it in industrial processes.

When the compositions according to this invention are used for the purpose of making shell moulds or cores, whether used in the form of a powder mixed with the sand or other refractory material or used as a coating on the grains of sand or other refractory material, the heat emitted by the pattern or core box at the range of temperatures generally employed in shell moulding (viz. from say 180° C. to 300° C.) causes the active components of the composition to react to form a plastic and cohesive binder which will cause a sufficiently thick layer of mould material to adhere to the working face of the pattern or core box within a period which may vary from about 2 to 3 seconds to about 45 seconds, depending on the temperature of the pattern or core box and on the thickness of the investment required commensurate with the metal section of the casting to be made. After the surplus and non-adherent mould material has been removed further heating, the duration of which depends on the temperature and the thickness of the investment but is generally within the range of about 45 seconds to about 4 minutes, will then cause the adherent layer or shell to set and harden yielding a shell mould or core or part thereof of sufficient strength to allow it to be detached from the pattern or core box and to withstand the heat and impact of molten metal sufficiently long for use in casting. Similar observations apply to the use of the composition in the manufacture of plastic articles according to the methods well known in the industry.

Processes for the manufacture of a thermosetting composition according to the invention will now be described in greater detail in the following examples:

Example 1

100 lbs. of a 1:1 mixture of Redhill H and Redhill F sands was heated to 160° C. and transferred to a Mullrex muller. When the temperature of the sand fell to 140° C., 5 lbs. of dextrose monohydrate containing 6% ammonium sulphate was added. This was mixed for a time of 2½ to 3 minutes. The temperature fell to approximately 70° C. and 12 ozs. of bisulphited quebracho extract was added. Mixing was continued for a further minute whereupon the temperature of the mixture fell to about 60° C. 2 ozs. of hexamethylenetetramine and 200 mls. of commercial aniline were then added and after a further 1 minute's mixing the resultant composition was discharged and allowed to cool to ambient temperature. Shell moulds were prepared using this mixture and test pieces gave flexural strengths of the order of 1,100 lbs. per square inch.

Example 2

100 lbs. of a 1:1 mixture of Redhill H and Redhill F sands was heated to 160° C. and transferred to a Mullrex muller. When the temperature of the sand fell to 140° C., 5 lbs. of dextrose monohydrate containing 6% ammonium sulphate was added. This was mixed for a time of 2½ to 3 minutes. The temperature fell to approximately 70° C. and 12 ozs. of bisulphited quebracho extract was added. Mixing was continued for a further minute whereupon the temperature of the mixture fell to about 60° C. 2 ozs. of hexamethylenetetramine and 200 mls. of orthotoluidine were then added and after a further 1 minute's mixing the resultant composition was discharged and allowed to cool to ambient temperature. Shell moulds were prepared using this mixture and test pieces gave flexural strengths of the order of 1,000 lbs. per square inch.

Example 3

The thermosetting composition can be produced by mixing the various ingredients together with sand in a mixer using sand at ambient temperature.

Table 1 gives particulars of various thermosetting compositions and in the table the weight of other constituents is expressed as a percentage of the weight of the carbohydrates. The thermosetting compositions described in the Table 1 were prepared, in each case, by thoroughly mixing the constituents in the proportions stated in Table 1. Experiments 1 and 2, which include no amine, are included for comparison purposes only.

To prepare a shell moulding mixture, 50 lbs. of Redhill H sand and 50 lbs. of Redhill F sand were thoroughly

| Experiment No. | Carbohydrate | Mineral acid or salt liberating such acid | Organic acid | Cross-linking agent | Amine |
|---|---|---|---|---|---|
| 1 | Dextrose monohydrate | Nil | 10% sulphited quebracho extract | 1.25% hexamine | Nil. |
| 2 | do | 6% (NH₄)₂SO₄ | do | do | Nil. |
| 3 | do | Same as above | do | do | 0.5% aniline. |
| 4 | do | do | 15% sulphited quebracho extract | do | Do. |
| 5 | do | do | 20% sulphited quebracho extract | do | Do. |
| 6 | do | do | 7.5% sulphited quebracho extract | do | 0.32% aniline. |
| 7 | do | do | do | do | 0.64% aniline. |
| 8 | do | do | do | do | 1.25% aniline. |
| 9 | do | do | do | do | 2.5% aniline. |
| 10 | do | do | do | do | 5.0% aniline. |
| 11 | do | do | 15% sulphited quebracho extract | 1.25 phthalic anhydride | Do. |
| 12 | do | do | do | 2.5% phthalic anhydride | Do. |
| 13 | do | do | do | 5.0% phthalic anhydride | Do. |
| 14 | do | do | 5% sulphited quebracho extract | 1.25% hexamine | Do. |
| 15 | do | do | 10% sulphited quebracho extract | do | Do. |
| 16 | do | do | 20% sulphited quebracho extract | do | Do. |
| 17 | do | do | 40% sulphited quebracho extract | do | Do. |
| 18 | do | do | 5% citric acid | do | Do. |
| 19 | do | do | 10% citric acid | do | Do. |
| 20 | do | do | 20% citric acid | do | Do. |
| 21 | Sucrose | 5% HCl | 10% sulphited quebracho extract | do | Do. |
| 22 | Dextrose hydrate (3 lbs.) / Maize dextrin (2 lbs.) | 6% (NH₄)₂SO₄ | do | do | Do. |
| 23 | Dextrose monohydrate preheated to 140° C. | do | do | do | Do. |
| 24 | Dextrose monohydrate | do | do | do | 5% melamine. |

NOTE: The product of Experiment 22 showed signs of thermoplasticity.

mixed with 5 lbs. of a thermosetting composition. It will be understood that the above mixture is only one example of a shell moulding mixture. Other mixes can be prepared by adding varying percentages of up to 10% of the thermosetting composition, to a suitable dry granular refractory material.

Table 2 indicates the properties of shell moulds derived from moulding mixtures made up according to the foregoing example with the thermosetting compositions of Table 1. The curing time given is determined as the time taken to cure a shell mould formed on a pattern plate the temperature of which is 280° C.±2° C. which has been invested for a period of 25 seconds from a dump box containing 40 lbs. of moulding mixture.

Flexural strength and breaking load are determined from a test bar made by reducing to dimensions 1.0 inches x 0.25 inches x 5.0 inches (±0.002 inch) a piece of cured shell mould. The test bar is broken on a three point loading with 1½ inches between supports.

TABLE 2

| Experiment No. | Curing time, minutes | Breaking load, lbs. | Flexural strength, lbs./sq. in. |
|---|---|---|---|
| 1 | 3 | 17.0 | 612 |
| 2 | 4 | 18.5 | 666 |
| 3 | 3 | 26.0 | 936 |
| 4 | 3 | 26.5 | 954 |
| 5 | 2.75 | 27.5 | 990 |
| 6 | 3 | 27.5 | 990 |
| 7 | 2.9 | 27.5 | 990 |
| 8 | 2.9 | 26.0 | 936 |
| 9 | 2.5 | 26.0 | 936 |
| 10 | 3 | 26.0 | 936 |
| 11 | 3 | 23.0 | 838 |
| 12 | 3 | 25.5 | 918 |
| 13 | 3 | 25.5 | 918 |
| 14 | 3 | 14.0 | 864 |
| 15 | 3 | 27.0 | 972 |
| 16 | 3 | 32.0 | 1170 |
| 17 | 3 | 35.0 | 1278 |
| 18 | 3 | 18.0 | 648 |
| 19 | 3 | 26.5 | 954 |
| 20 | 3 | 24.5 | 892 |
| 21 | 3.5 | 24.5 | 882 |
| 22 | 3 | 19.0 | 684 |
| 23 | 2 | 27 | 972 |
| 24 | 2.5 | 27.5 | 990 |

By way of comparison only, a shell moulding mixture made up of sand and dextrose monohydrate required a curing time of 4.5 minutes and a test specimen had a breaking load of 11.5 lbs. and a flexural strength of 414 lbs. per square inch. The addition of 6% ammonium sulphate shortened the curing time to 4 minutes and increased slightly the breaking load and flexural strength to 14.5 lbs. and 522 lbs. per square inch respectively.

A thermosetting composition comprising 5 lbs. of dextrose monohydrate with 6% ammonium sulphate, 1.25% hexamine and 5% aniline required a curing time of 3 minutes and had a breaking load of 19.0 lbs. and a flexural strength of 614 lbs. per square inch.

Example 4

A binder was prepared by intimately mixing the finely divided constituents in the following proportions:

| | Parts |
|---|---|
| Dexacor | 90 |
| Sulphited quebracho extract | 12 |
| Melamine | 8 |
| Hexamine | 2 |

3 lb. 6 oz. of the above mixture were added to 1 cwt. of Redhill F sand and mixed for 1 minute in a Mullrex mill. Two pints of water were then added to the mixture of sand and binder and mixing was continued for a further 3 to 4 minutes. The mixture was then discharged and used to produce cores by the hot box process.

A tensile test piece was prepared from the above mixture and gave a strength of 308 lbs. per square inch. Flexural strength figures were of the order of 774 lbs. per square inch. The addition of 4 parts of melamine-formaldehyde condensate (melamine to formaldehyde ratio between 1:2.2 and 1:4.5) will be advantageous in that the center of the core will slowly harden completely after removal of the core from the heated core box.

Example 5

5 lbs. of dextrose monohydrate containing 6% of $(NH_4)_2SO_4$ were melted in an open container at 125° C. and 12 ozs. of sulphited quebracho extract, 4 oz. of melamine and 2 ozs. of hexamine were added while the mixture was stirred rapidly using a high speed mixer. The mixture was poured into a suitably vented and enclosed mould heated to 250° C. leaving sufficient space to accommodate for the expansion of the material. After curing, the material consisted of a rigid foam with excellent thermal insulating properties, good mechanical strength and resistance to thermal degradation. The foam could be further improved by the addition of substances which liberate large volumes of an inert gas on heating, such as azo dicarbonamide. These substances must be added immediately prior to pouring and mixed-in using the high speed mixer.

Example 6

A binder was prepared by intimately mixing the finely divided constituents in the following proportions:

| | Parts |
|---|---|
| Dexacor | 90 |
| Sulphited quebracho extract | 12 |
| Melamine:1 part of hexamine | 8 |

6 lb. 15 ozs. of the above mixture were added to 56 lbs. of Redhill H sand and 56 lbs. of Redhill F sand and mixed for two minutes in a Mullrex mill. 600 mls. of a 2% solution of ethyl cellulose, dissolved in industrial methylated spirits, were then added slowly to the mixture in the mill and mixing continued for a further four minutes. The mixture was then discharged and allowed to air dry. Test pieces produced from this mixture gave a flexural strength of approximately 930 lbs. per square inch.

Example 7

A binder was prepared by intimately mixing the finely divided constituents in the following proportions:

| | Parts |
|---|---|
| Dexacor | 90 |
| Sulphited quebracho extract | 12 |
| Melamine | 8 |
| Hexamine | 1 |
| Melamine formaldehyde resin=M/F ratio L:3 | 4 |

7 lbs. 3 ozs. of the above mixture were added to 56 lbs. of Redhill H sand and 56 lbs. of Redhill F sand and mixed together for two minutes in a Mullrex mill. 300 mls. of water were then added and mixing continued for a further period of four minutes. The mixture was then discharged and subsequently the water removed either by air drying or by drying it in a current of warm air. Test pieces produced from the mixture gave a flexural strength of approximately 970 lbs. per square inch.

Example 8

90 lbs. of Dexacor, 12 lbs. of sulphited quebracho extract, 6 lbs, of melamine and 2 lbs. of dicyandiamine were mixed together in a blade mixer. 6 lbs. of the above mixture were mixed in a Mullrex mill with 1 cwt. of Redhill F sand, the sand being preheated to a temperature of 110° C.

120 ml. of water were added to the mixture of sand and binder and mixing continued for a period of 9 minutes after which 2 ozs. of hexamine were added. Mixing was continued for a further minute after which the mixture was discharged and used for making moulds and cores by the shell process.

Example 9

90 lbs. of Dexacor, 12 lbs. of sulphited quebracho extract and 6 lbs. of melamine were mixed together in a blade type mixer. 6 lbs. of the above mixture were mixed in a Mullrex mill with 1 cwt. of Redhill F sand, the sand being preheated to a temperature of 110° C.

After a mixing period of up to half a minute, half a pint of a solution of a water-soluble precondensate, prepared by dissolving 3 lbs. of sulphited quebracho extract and 2 lbs. of dicyandiamide in water and distilling off the water until the solids content of the solution was 50% by weight of the solution, was added to the mixture in the mill. Mixing was continued until the green bond originally formed broke down and the agglomerated sand particles separated and then 2 oz. of hexamine were added.

After a further minute mixing, the mixture was discharged and used for making moulds and cores by the shell process.

The chemistry of the resinification process is very complex and numerous possible reaction schemes could proceed simultaneously. While it is not intended to limit the application in any way, by speculations on this chemistry, it is thought that the reactions involved could possibly proceed along the following lines:

(1) Esterification of some of the hydroxyl groups in the saccharide units by reaction with the carboxylic groups in the carboxylic acids.

(2) Formation of a three dimensional structure from these esters by:

(a) Formation of indirect and direct cross linkage, possibly a methylene ether bridge, between unesterified hydroxyl groups in the saccharide units and difunctional cross linging agents such as hexamine, formaldehyde, phthalic anhydride, maleic anhydride and the like.

(b) Formation of direct cross linkage between incompletely esterified saccharide units and any di- and tri-functional carboxylic acids in the reaction scheme.

(c) Formation of indirectly cross linked saccharide ester units by reaction between the hydroxylic or phenolic constituents of the side chains and difunctional cross linking agents. (The phenolic constituents of the tannins, particularly the condensed tannins, are reported to possess a tri-functional resorcinol-type activity.)

(3) The action of the mineral acid or salt liberating an acid when heated is not clear. The acid is thought to be concerned with the production of oxidative degration products, particularly carboxylic acids such as the aldonic and saccharic series. These could react with hydroxyl groups on adjacent saccharide units. The acid catalyst may however only be concerned with the provision of a suitable acidic state to facilitate the interreaction between carboxylic groups and hydroxyl groups.

(4) The action of the amines in the system could involve reaction between the amino groups of the amines and the hemiacetal group of the carbohydrate leading to the N-glycoside. Further reaction with difunctional cross linking agents is possible since the amines suitable for this process are capable of further reaction with these compounds even after preliminary condensation with the hemiacetal groups of the carbohydrate. It is thought that this reaction does not occur at every hemiacetal position in every saccharide unit as tests indicate that optimum physical properties are obtained with less than molar proportions of the amines.

(5) A considerable amount of hexose decomposition takes place during the course of the reaction resulting in the production of such intermediates as 5-hydroxy methylfurfural which can take part in reactions with amines and organic acids.

(6) There is also evidence that any hexose units in the polymer are in the furanose form rather than the pyranose form, which is naturally found in such polymers as starch and cellulose.

What is claimed is:

1. A thermosetting composition consisting essentially of 75 to 95 parts by weight of a carbohydrate selected from the group consisting of dextrose monohydrate, and invert sucrose, lactose and maltose substantially 6% by weight, calculated on the carbohydrate, of a member selected from the group consisting of sulphuric acid, phosphoric acid, and hydrochloric acid and salts liberating such acids on heating, 5 to 20 parts by weight of at least one member of the group of compounds known as tannins, 0.2 to 5 parts by weight of hexamethylenetetramine, and 1 to 15 parts by weight of an amine mixture consisting of melamine and at least 25% by weight of dicyandiamide.

2. The composition of claim 1, in which at least one of the components of the amine mixture is present in the form of a water soluble tannin precondensate.

3. A shell molding mixture consisting essentially of a granular refractory material and, as binder, from 2 to 10% by weight calculated on the granular refractory material of a thermosetting composition as claimed in claim 1.

4. A shell molding mixture as claimed in claim 3 in which at least one of the components of the amine mixture is present in the composition in the form of a water soluble precondensate to provide greater strength.

5. A thermosetting composition consisting essentially of 75 to 95 parts by weight of dextrose monohydrate, containing substantially 6% by weight, calculated on the dextrose monohydrate, of ammonium sulphate, 5 to 20 parts by weight of sulphite quebracho extract, 0.2 to 5 parts by weight of hexamethylenetetramine and 1 to 15 parts by weight of an amine mixture consisting of melamine and at least 25% by weight of dicyandiamide.

6. A thermosetting composition as claimed in claim 5 in which the dicyandiamide component of the amine mixture is present in the form of a water soluble precondensate of dicyandiamide and sulphited quebracho extract.

7. A shell molding mixture consisting essentially of a granular refractory material and, as binder, from 2 to 10 percent by weight, calculated on the granular refractory material, of a thermosetting composition as claimed in claim 5.

8. A shell molding mixture as claimed in claim 7 in which the dicyandiamide component of the amine mixture is present in the form of a water soluble precondensate of dicyandiamide and sulphited quebracho extract.

9. A process for the manufacture of a shell molding mixture comprising a granular refractory material, and as binder, a proportion within the range of 2 to 10% by weight calculated on the granular refractory material, of a thermosetting composition consisting essentially of 75 to 95 parts by weight of dextrose monohydrate, containing substantially 6%, calculated on the weight of the dextrose monohydrate, of ammonium sulphate, 5 to 20 parts by weight of sulphite quebracho extract, 0.2 to 5 parts by weight of hexamethylenetetramine and 1 to 15 parts by weight of a mixture consisting of melamine and at least 25% by weight of dicyandiamide, wherein the refractory material and the dextrose monohydrate containing ammonium sulphate are mixed and heated to a temperature within the range of 118° C. to 140° C. and the sulphite quebracho extract, hexamethylenetetramine and the mixture of melamine and dicyandiamide are added to the mixture after cooling.

10. A process for the manufacture of a shell molding mixture comprising a granular refractory material and, as binder, a proportion within the range of 2 to 10% by weight, calculated on the granular refractory material, of a thermosetting composition consisting essentially of 75 to 95 parts by weight of dextrose monohydrate, containing substantially 6% by weight, calculated on the dextrose monohydrate, of ammonium sulphate, 5 to 20 parts by weight of sulphited quebracho extract, 0.2 to 5 parts by weight of hexamethylenetetramine and 1 to 15 parts by weight of a mixture consisting of melamine and at least 25% by weight of dicyandiamide, wherein the refractory material is heated to a temperature within the range of 100° C. to 160° C., powdered dextrose monohydrate containing ammonium sulphate is then mixed with the hot refractory material and then, when the temperature has fallen below 90° C. a part of the sulphited quebracho extract and the melamine is mixed in followed by the remainder of the sulphited quebracho extract and the dicyandiamide, in the form of a solution of a water-soluble precondensate of the quebracho extract and the dicyandiamide, the amount of the quebracho extract used for the preparation of said precondensate being such that the weight ratio of quebracho extract to dicyandiamide is within the range of from 60 to 90 parts of quebracho extract to 40 to 10 parts of said dicyandiamide, and finally, the hexamethylenetetramine is added and mixed in.

11. A process for the manufacture of a shell molding mixture comprising a granular refractory material and, as binder, a proportion within the range of 2 to 10% by weight calculated on the granular refractory material, of a thermosetting composition consisting essentially of 75 to 95 parts by weight of dextrose monohydrate, containing substantially 6%, calculated on the weight of the dextrose monohydrate, of ammonium sulphate, 5 to 20 parts by weight of sulphited quebracho extract, 0.2 to 5 parts by weight of hexamethylenetetramine and 1 to 15 parts by weight of a mixture consisting of melamine and at least 25% by weight of dicyandiamide, wherein the refractory material is heated to a temperature within the range of 100° C. to 140° C. and the binder composition is mixed into the hot refractory material.

12. A process for the manufacture of a shell molding mixture comprising a granular refractory material and, as binder, a proportion within the range of 2 to 10% by weight, calculated on the granular refractory material, of a thermosetting composition comprising 75 to 95 parts by weight of dextrose monohydrate, containing substantially 6% by weight, calculated on the dextrose monohydrate, of ammonium sulphate, 5 to 20 parts by weight of sulphited quebracho extract, 0.2 to 5 parts by weight of hexamethylenetetramine and 1 to 15 parts by weight of a mixture consisting of melamine and at least 25% by weight of dicyandiamide, wherein the dextrose monohydrate containing ammonium sulphate, a part of the sulphited quebracho extract, the melamine, and the hexamethylenetetramine are mixed into the refractory material at room temperature and subsequently a solution of water-soluble condensate of the dicyandiamide, the amount of the quebracho extract used for the preparation of said precondensate being such that the weight ratio of quebracho extract to dicyandiamide is within the range of from 60 to 90 parts of quebracho extract to 40 to 10 parts of said dicyandiamide, and the remainder of the sulphited quebracho extract is added to the mixture and mixed in.

References Cited

UNITED STATES PATENTS 3,046,146    7/1962    Woodhead et al. _____ 106—38.5

JULIUS FROME, Primary Examiner

L. B. HAYES, Assistant Examiner

U.S. Cl. X.R.

106—38.23; 260—17.2, 17.3